(12) United States Patent
Duan et al.

(10) Patent No.: US 11,665,000 B2
(45) Date of Patent: May 30, 2023

(54) METHOD AND APPARATUS FOR PROCESSING PRIVACY DATA OF BLOCK CHAIN, DEVICE, AND STORAGE MEDIUM

(71) Applicant: Baidu Online Network Technology (Beijing) Co., Ltd., Beijing (CN)

(72) Inventors: Bing Duan, Beijing (CN); Wei Xiao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 214 days.

(21) Appl. No.: 17/116,327

(22) Filed: Dec. 9, 2020

(65) Prior Publication Data
US 2021/0377038 A1    Dec. 2, 2021

(30) Foreign Application Priority Data

May 29, 2020   (CN) .......................... 202010474245.3

(51) Int. Cl.
*H04L 9/32* (2006.01)
*G06F 21/60* (2013.01)
(Continued)

(52) U.S. Cl.
CPC .......... *H04L 9/3239* (2013.01); *G06F 21/602* (2013.01); *H04L 9/008* (2013.01); *H04L 63/0442* (2013.01); *H04L 9/50* (2022.05)

(58) Field of Classification Search
CPC ... H04L 9/3239; H04L 9/008; H04L 63/0442; H04L 9/50; G06F 21/602
See application file for complete search history.

(56) References Cited

U.S. PATENT DOCUMENTS 9,819,679 B1 * 11/2017 Bertz .................... H04W 12/06
2016/0261404 A1    9/2016 Ford et al.
(Continued)

FOREIGN PATENT DOCUMENTS

| CN | 107749865 A | 3/2018 |
|---|---|---|
| CN | 108055128 A | 5/2018 |

(Continued)

OTHER PUBLICATIONS

Japanese Patent Application No. 2021-026236 Notice of Reason for Refusal dated Jul. 5, 2022; 7 pages.
(Continued)

*Primary Examiner* — Ayoub Alata
(74) *Attorney, Agent, or Firm* — Cozen O'Connor

(57) ABSTRACT

Embodiments of the present disclosure disclose a method for processing privacy data of a block chain. When implemented by a block chain node, a specific implementation comprises: acquiring a data calculation transaction request initiated by a data user side based on a privacy smart contract; acquiring homomorphically encrypted source data according to the data calculation transaction request; invoking the privacy smart contract according to a calculation task in the data calculation transaction request; and performing an uplink operation on the data calculation transaction request and the calculation result to feed the data calculation transaction request and the calculation result back to the data user side of the data calculation transaction request, for the data user side to perform a homomorphic decryption and de-blinding on the calculation result, to acquire a plaintext calculation result. Thus, the scheme of processing the privacy data of the block chain is optimized.

19 Claims, 10 Drawing Sheets

(51) Int. Cl.
  *H04L 9/00* (2022.01)
  *H04L 9/40* (2022.01)

(56) References Cited

U.S. PATENT DOCUMENTS

| | | | |
|---|---|---|---|
| 2017/0289111 | A1 | 10/2017 | Voell et al. |
| 2020/0169387 | A1* | 5/2020 | Wei .................... G06F 21/6272 |
| 2021/0150524 | A1 | 5/2021 | Yan et al. |

FOREIGN PATENT DOCUMENTS

| | | |
|---|---|---|
| CN | 108830716 A | 11/2018 |
| CN | 108961058 A | 12/2018 |
| CN | 109690551 | 4/2019 |
| CN | 110033368 A | 7/2019 |
| CN | 110298190 A | 10/2019 |
| CN | 111125763 A | 5/2020 |
| CN | 111143890 A | 5/2020 |
| JP | H03-80386 A | 4/1991 |
| JP | 2002-535878 | 10/2002 |
| JP | 2013-125039 A | 6/2013 |
| JP | 2019-35949 A | 3/2019 |
| WO | WO 2018/036441 A1 | 3/2018 |
| WO | WO 2020/037654 A1 | 2/2020 |
| WO | WO-2020037654 A1 * | 2/2020 ......... G06F 21/6263 |

OTHER PUBLICATIONS

English translation of Japanese Patent Application No. 2021-026236 Notice of Reason for Refusal dated Jul. 5, 2022; 7 pages.
Ghadamyari et al., "Privacy-Preserving Statistical Analysis of Health Data Using Paillier Homomorphic Encryption and Permissioned Blockchain", IEEE International Conference on Big Data, 2019, 7 pages.
Paillier, "Public-Key Cryptosystems Based on Composite Degree Residuosity Classes", 1999, 16 pages.
European Patent Application No. 21158448.7, Extended European Search Report dated Aug. 6, 2021, 6 pages.
Korean Patent Application No. 10-2021-0025329 Notice of Allowance dated Feb. 23, 2022, 3 pages.

* cited by examiner

METHOD AND APPARATUS FOR PROCESSING PRIVACY DATA OF BLOCK CHAIN, DEVICE, AND STORAGE MEDIUM

CROSS-REFERENCE TO RELATED APPLICATIONS

This application claims priority to Chinese Patent Application No. 202010474245.3, filed with the China National Intellectual Property Administration (CNIPA) on May 29, 2020, the contents of which are incorporated herein by reference in their entirety.

TECHNICAL FIELD

The present disclosure relates to the computer technology, and specifically to the block chain technology.

BACKGROUND

With the development of block chain technology, the block chain technology has been gradually implemented in many application scenarios. The block chain technology is characterized by a multi-copy redundant mode in which a transaction request processed on the chain is validated and stored by all nodes of the chain. This mode would cause the issues that the privacy data on the chain may be obtained by a non-transactional party, and data of a smart contract would be also leaked out.

To address the above problems, an existing solution includes: performing a data calculation based on a trusted execution environment, or performing a privacy calculation entirely under the chain.

However, in the above solution the deployment cost of the TEE-based technical solution is relatively high, since the user needs to purchase special hardware, and the calculation under the chain would cause excessive centralization of the calculation, and thus, it is difficult to ensure the fairness and security of the calculation.

SUMMARY

Embodiments of the present disclosure provide a method and apparatus for processing privacy data of a block chain, a device and a storage medium, to optimize the scheme of processing privacy data of a block chain.

In a first aspect, some embodiments of the present disclosure provide a method for processing privacy data of a block chain by a block chain node, the method comprising: acquiring a data calculation transaction request, wherein the request is initiated by a data user side based on a privacy smart contract, and invocation data in the request refers to data after blinding performed by the data user side; acquiring homomorphically encrypted source data according to the request; invoking the privacy smart contract according to a calculation task in the request, to perform a calculation for the invocation data and the source data to acquire a calculation result; and performing an uplink operation on the request and the calculation result to feed the request and the calculation result back to the data user side, such that the data user side homomorphically decrypts and de-blinds the calculation result to acquire a plaintext calculation result.

In a second aspect, some embodiments of the present disclosure provide a method for processing privacy data of a block chain, performed by a block chain client, the method comprising: determining source data required for a calculation task from homomorphically encrypted data published in a block chain; blinding invocation data of the calculation task; initiating a data calculation transaction request for performing a calculation task for the invocation data and the source data based on a privacy smart contract configured by a block chain node, to request the block chain node to invoke the privacy smart contract to perform the calculation task and acquire a calculation result; acquiring an uplink calculation result; requesting a data provider side of the source data to provide a homomorphic encryption public key; and decrypting homomorphically the calculation result by using the homomorphic encryption public key, and de-blinding the calculation result to acquire a plaintext calculation result.

In a third aspect, some embodiments of the present disclosure provide an apparatus for processing privacy data of a block chain by a block chain node, the apparatus comprising: a transaction request acquiring module, configured to acquire a data calculation transaction request, wherein the request is initiated by a data user side based on a privacy smart contract, and invocation data in the request refers to data after blinding performed by the data user side; a source data acquiring module, configured to acquire homomorphically encrypted source data according to the request; a calculation task processing module, configured to invoke the privacy smart contract according to a calculation task in the request, to perform a calculation for the invocation data and the source data to acquire a calculation result; and an uplink processing module, configured to perform an uplink operation on the request and the calculation result to feed the request and the calculation result back to the data user side, such that the data user side homomorphically decrypts and de-blinds the calculation result to acquire a plaintext calculation result.

In a forth aspect, some embodiments of the present disclosure provide an apparatus for processing privacy data of a block chain, configured in a block chain client, the apparatus comprising: a source data determining module, configured to determine source data required for a calculation task from homomorphically encrypted data published in a block chain; a blinding module, configured to perform blinding invocation data of the calculation task; a calculation request initiating module, configured to initiate a data calculation transaction request for performing a calculation task for the invocation data and the source data based on a privacy smart contract configured by a block chain node, to request the block chain node to invoke the privacy smart contract to perform the calculation task and acquire a calculation result; a calculation result acquiring module, configured to acquire an uplink calculation result; a key acquiring module, configured to request a data provider side of the source data to provide a homomorphic encryption public key; and a calculation result processing module, configured to perform a homomorphic decryption on the calculation result by using the homomorphic encryption public key, and de-blinding the calculation result to acquire a plaintext calculation result.

In a fifth aspect, some embodiments of the present disclosure provide an electronic device, comprising: at least one processor; and a memory, communicatively connected to the at least one processor; wherein, the memory, storing instructions executable by the at least one processor, the instructions, when executed by the at least one processor, cause the at least one processor to perform the method according to the first aspect and the second aspect.

In a sixth aspect, some embodiments of the present disclosure provide A non-transitory computer readable storage medium, storing computer instructions, the computer instructions, being used to cause the computer to perform the method according to the first aspect and the second aspect.

According to the technology of the present disclosure, different from the existing technology, the security and privacy can be ensured when the privacy data of the block chain is processed, and thus the scheme of processing the privacy data of the block chain is optimized.

It should be understood that the content described in this section is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

Accompanying drawings are used for a better understanding of the scheme, and do not constitute a limitation to the present disclosure. Here.

DETAILED DESCRIPTION OF EMBODIMENTS

Exemplary embodiments of the present disclosure are explained below in combination with the accompanying drawings, and various details of the embodiments of the present disclosure are included in the explanation to facilitate understanding, and should be regarded as merely exemplary. Therefore, it should be recognized by those of ordinary skill in the art that various changes and modifications may be made to the embodiments described herein without departing from the scope and spirit of the present disclosure. Likewise, for clarity and conciseness, descriptions for well-known functions and structures are omitted in the following description.

Figure 1:
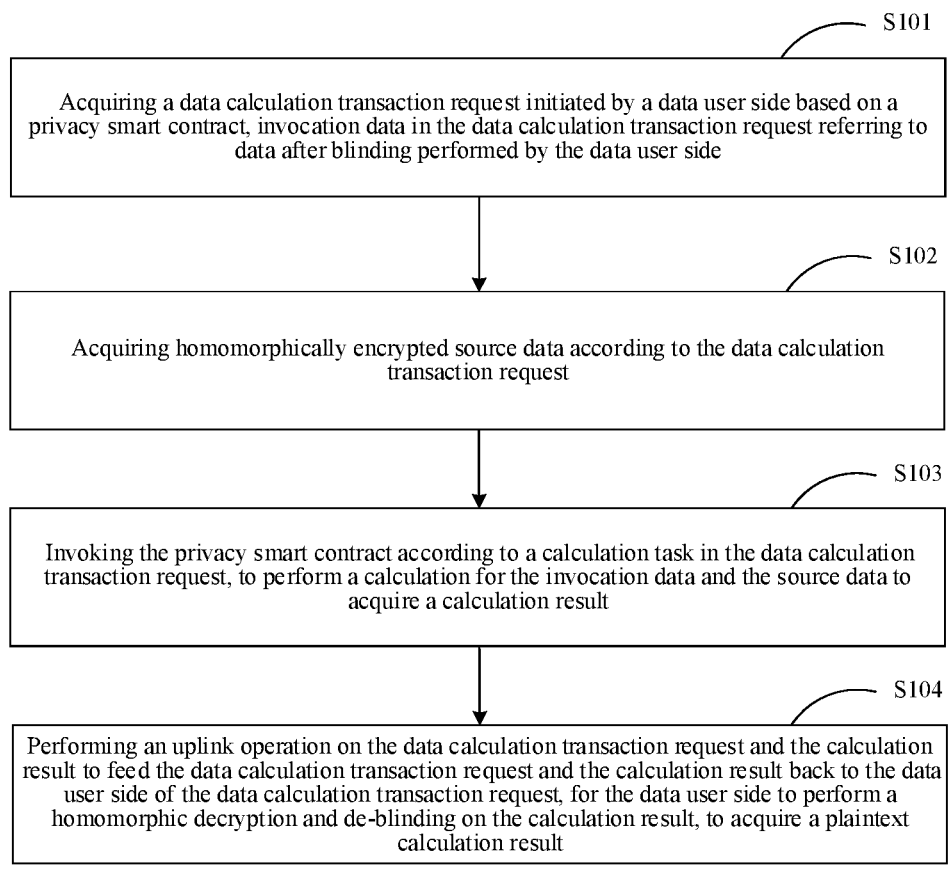
FIG. 1 is a flowchart of a method for processing privacy data of a block chain provided according to an embodiment of the present disclosure.

FIG. 1 is a flowchart of a method for processing privacy data of a block chain according to an embodiment of the present disclosure. The embodiment of the present disclosure is applicable to a situation where privacy data in a block chain is calculated and processed. This embodiment may be implemented by an apparatus for processing privacy data of a block chain, which is configured in a block chain node. The apparatus may be implemented by means of software and/or hardware, and integrated in an electronic device used as the block chain node.

As shown in FIG. 1, the method includes:

S101, acquiring a data calculation transaction request that is initiated by a data user side based on a privacy smart contract, wherein invocation data in the data calculation transaction request refers to data after blinding performed by the data user side.

Here, the data user side may be a user of a block chain who wants to perform a data processing operation using the source data stored in the block chain. The privacy smart contract may be a collection of programs for processing privacy data. In the privacy smart contract, an interactive interface may be provided for the user to initiate different contents of data and response data, to generate or perform a specific transaction request. The data calculation transaction request may be a request that is initiated by the data user side in a current block chain network based on the privacy smart contract and used for requesting a block chain node to perform a related data calculation task.

Alternatively, the data calculation transaction request initiated by the data user side may include a calculation task to be performed this time and data required for e performing the calculation task. Alternatively, the data required for the calculation task may include invocation data, and the invocation data refers to data that the data user side itself needs to provide when this calculation task is performed. Since the own data of the data user side may be privacy data, which is desired not to be disclosed during the performing of the calculation task, in the embodiment of the present disclosure, the invocation data in the data calculation transaction request may be the data after the blinding performed by the data user side. Here, the blinding may mean that the data user side processes the invocation data thereof according to a rule set by the data user side, such that the processed data does not leak the plaintext of the invocation data and the data calculation task may also be continued. It should be noted that the rule of the blinding is reversible, and after the performing for the calculation task is completed based on the invocation data after the blinding, de-blinding is also required to be performed on the calculation result.

Alternatively, in the embodiment of the present disclosure, the method of the blinding may be more than one, which is not limited thereto. For example, the blinding may include adding a random value to the invocation data, and the de-blinding includes removing the random value from the calculation result. Here, the adding a random value may be at least one of addition, subtraction, multiplication, or division, and correspondingly, the removing the random value is the inverse process of the adding a random value. For example, assuming that the invocation data is 5 and the random value is 10, performing the blinding on the invocation data may refer to that the result 15 obtained by adding the invocation data 5 and the random value 10 together is used as the invocation data after the blinding. If the calculation result is 20, the calculation result 10 obtained by subtracting the random value 10 from the calculation result 20 is used as the calculation result after the de-blinding. The blinding may further include: performing an operation on the invocation data itself, for example, obtaining the power, the logarithm, etc. of the invocation data itself. Correspondingly, the de-blinding includes: performing an operation on the calculation result, for example, obtaining the root, the exponent, etc. of the calculation result.

Alternatively, in this operation, a local block chain node may locally acquire the data calculation transaction request initiated by the data user side based on the privacy smart contract, or may receive, through the block chain network, a data calculation transaction request transmitted by an other node.

S102, acquiring homomorphically encrypted source data according to the data calculation transaction request.

The homomorphically encrypted source data may be obtained by performing a homomorphic encryption on the source data of a data provider side through a homomorphic encryption technique. The so-called source data may be internal privacy data of the data provider side, e.g., employee information and customer information. In order to ensure the security and privacy of the source data, the data provider side generally performs the homomorphic encryption on its source data, and then stores the source data into a block chain, for use by an other block chain user. The reason why the embodiment of the present disclosure chooses to perform the homomorphic encryption on the source data is that, after being decrypted, the calculation result of the calculation task performed using the homomorphically encrypted source data is the same as the calculation result of the calculation task performed using the unencrypted plaintext of the source data. Thus, it is implemented that while it is ensured that the plaintext of the source data of the data provider side is not leaked, the plaintext may further be provided for the data user side to perform the calculation task.

Alternatively, in the embodiment of the present disclosure, the data provider side may perform the homomorphic encryption on its source data, and then upload the source data to the block chain network for storage. After receiving the data calculation transaction request initiated by the data user side, the local block chain node first determines, from the data calculation transaction request, the relevant information of the source data pointed to by this calculation task, for example, the identifier ID of the source data, the data provider side, and the data usage amount. Then, the local block chain node finds and acquires, from the block chain network, the homomorphically encrypted source data pointed to by the related information.

S103, invoking the privacy smart contract according to a calculation task in the data calculation transaction request, to perform a calculation for the invocation data and the source data to acquire a calculation result.

Here, the calculation task may be a calculation task that the data user side needs to perform this time by using the homomorphically encrypted source data and its own invocation data. For example, the calculation task may include, but not limited to, a model training task, a data statistics task, a data prediction task, etc.

Alternatively, in this operation, the local block chain node may first acquire, from the data calculation transaction request, the calculation task required to be performed, and then invoke the privacy smart contract to perform the calculation task for the invocation data after the blinding in the data calculation transaction request and for the homomorphically encrypted source data acquired in S102, to obtain the calculation result.

For example, assuming that a calculation transaction request published by the data user side is to train a face recognition network model, the local block chain node acquires, from the calculation transaction request, the related data of the to-be-trained face recognition model after the blinding as the invocation data, and acquires, from the block chain network, a large number of homomorphically encrypted user face images as the source data. Then, the local block chain node invokes the related program code performing model training in the privacy smart contract, performs model parameter training on the face recognition model corresponding to the invocation data with the source data as a training sample, and obtains the trained face recognition module as the calculation result.

S104, performing an uplink operation on the data calculation transaction request and the calculation result to feed the data calculation transaction request and the calculation result back to the data user side of the data calculation transaction request, for the data user side to perform a homomorphic decryption and de-blinding on the calculation result, to acquire a plaintext calculation result.

Alternatively, in this operation, after performing this calculation task and obtaining the calculation result, the local block chain node may invoke the related program code of the uplink operation in the privacy smart contract to perform uplink storage on the data calculation transaction request processed this time and the calculation result calculated this time. At this time, the data user side may acquire, from the block chain, the calculation result of the data calculation transaction request initiated by the data user side. Since the calculation result is obtained by calculating the source data after the homomorphic encryption performed by the data provider side and the invocation data after the blinding, the data user side needs to perform the homomorphic decryption on the calculation result to obtain a preliminary plaintext calculation result, which is the same as the result obtained by performing this calculation task using the unencrypted source data. Then, based on the inverse operation when the data user side itself performs the blinding on the invocation data, the de-blinding is performed on the preliminary plaintext calculation result to obtain a final plaintext calculation result.

Alternatively, in the embodiment of the present disclosure, the homomorphic decryption performed on the calculation result may refer to that, a homomorphic encryption key (e.g., a homomorphic encryption public key) used when the provider side of the source data used in this calculation task performs the homomorphic encryption on the source data is acquired to perform the homomorphic decryption on the calculation result. For example, it is possible that an off-line interaction with the data provider side is performed to request the acquisition of the homomorphic encryption public key of the data provider side. It is also possible that an acquisition request for the key of the data provider side is initiated to the block chain network to acquire the homomorphic encryption public key of the data provider side, which is not limited in the embodiment of the present disclosure.

According to the technical solution of the embodiment of the present disclosure, after acquiring the data calculation transaction request initiated by the data user side, the block chain node acquires the homomorphically encrypted source data required for the performing of this calculation task and the invocation data after the blinding, invokes the privacy smart contract to perform this calculation task to obtain the calculation result, and performs the uplink storage on the calculation result. In the embodiment of the present disclosure, the source data used when the calculation task is performed is the source data after the homomorphic encryption performed by the data provider side, which ensures the security of the data of the data provider side. The invocation data used is the data after the blinding performed by the data user side, which ensures the security of the data of the data user side. Finally, the accuracy of the calculation result is ensured through the decryption and the de-blinding. The entire process of processing the privacy data may be completed by using a conventional block chain node without causing the leakage of the data of the data provider side and the data user side, thereby ensuring the fairness and security of the privacy data processing process. Thus, the scheme of processing the privacy data of the block chain is optimized.

Figure 2:
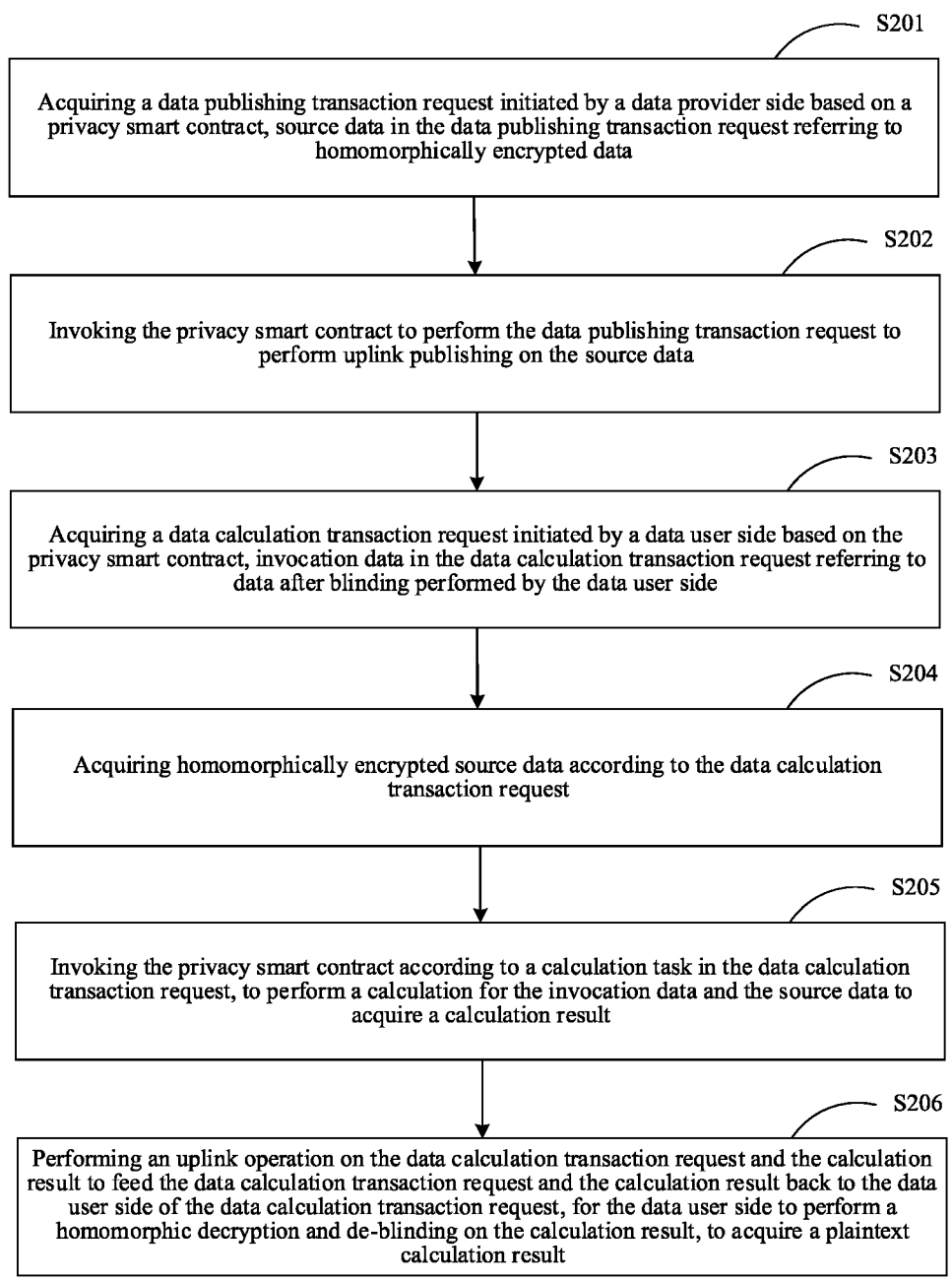
FIG. 2 is a flowchart of another method for processing privacy data of a block chain provided according to an embodiment of the present disclosure.

FIG. 2 is a flowchart of another method for processing privacy data of a block chain provided according to an embodiment of the present disclosure. This embodiment is further optimized on the basis of the above embodiment, and gives a detailed description for how a data publishing transaction request of the data provider side is processed. As shown in FIG. 2, the method specifically includes:

S201, acquiring a data publishing transaction request initiated by a data provider side based on a privacy smart contract, source data in the data publishing transaction request referring to homomorphically encrypted data.

Here, the data publishing transaction request may be a request that is initiated by the data provider side in a current block chain network based on the privacy smart contract and used for requesting a block chain node to perform uplink storage on the source data included in the data publishing transaction request. Alternatively, in the embodiment of the present disclosure, the source data included in the data publishing transaction request may be privacy data of the data provider side itself, and the source data is source data encrypted by using a homomorphic encryption algorithm.

Alternatively, when being required to upload the source data to the block chain network for use by an other block chain user, the data provider side may first encrypt its own source data by using the homomorphic encryption algorithm, and then initiate the data publishing transaction request to the block chain network based on the privacy smart contract. A local block chain node may locally acquire the data publishing transaction request sent by the data provider side based on the privacy smart contract, or may receive, through the block chain network, the data publishing transaction request transmitted by an other node.

S202, invoking the privacy smart contract to perform the data publishing transaction request to perform uplink publishing on the source data.

Alternatively, after receiving the data publishing transaction request, the local block chain node may invoke the privacy smart contract to perform the data publishing transaction request, and acquire to-be-published source data after the homomorphic encryption, and then store the acquired source data and the data publishing transaction request as transaction data into the block chain network for use by the user of an other block chain account.

Alternatively, in order to facilitate the user side selecting the source data that the user side needs to use, in the embodiment of the present disclosure, when initiating the data publishing transaction request, the data provider side may further add the digest information introducing the to-be-published source data, etc. to the to-be-published source data. Accordingly, in this step, when the privacy smart contract is invoked to perform the data publishing transaction request, the uplink storage is performed on the data publishing transaction request, the source data, and the digest information of the source data.

S203, acquiring a data calculation transaction request initiated by a data user side based on the privacy smart contract, invocation data in the data calculation transaction request referring to data after blinding performed by the data user side S204, acquiring homomorphically encrypted source data according to the data calculation transaction request.

S205, invoking the privacy smart contract according to a calculation task in the data calculation transaction request, to perform a calculation for the invocation data and the source data to acquire a calculation result.

S206, performing an uplink operation on the data calculation transaction request and the calculation result to feed the data calculation transaction request and the calculation result back to the data user side of the data calculation transaction request, for the data user side to perform a homomorphic decryption and de-blinding on the calculation result, to acquire a plaintext calculation result.

According to the technical solution of the embodiment of the present disclosure, after acquiring the data publishing transaction request initiated by the data provider side, the block chain node performs the data publishing transaction request to acquire the homomorphically encrypted source data to perform the uplink operation. The security of the source data of the data provider side is ensured. After acquiring the data calculation transaction request initiated by the data user side, the block chain node acquires the homomorphically encrypted source data required for the performing of this calculation task and the invocation data after the blinding, invokes the privacy smart contract to perform this calculation task to obtain the calculation result, and performs the uplink storage on the calculation result. In the embodiment of the present disclosure, while the plaintext of the source data and the plaintext of the invocation data are not leaked, the data user side is supported to perform the normal data calculation task. Moreover, the accurate calculation result may be obtained through the subsequent homomorphic decryption and the subsequent blinding. The fairness and security of the calculation are ensured.

Alternatively, in the embodiment of the present disclosure, the operation performed in S202 may refer to that the privacy smart contract is invoked to perform the data publishing transaction request to acquire data information of the source data, the data information including data user side information, description information of the source data, a storage position of the source data, and digest information of the source data; and the uplink operation is performed on the data publishing transaction request and the data information. Specifically, in the embodiment of the present disclosure, the data provider side initiates the data publishing transaction request based on the privacy smart contract and the data information of the to-be-published source data. The data information of the to-be-published source data may include: information of a user side having a permission to use data, the description information (e.g., a data type and a data size) of the source data to be published this time, the specific storage position of the source data, the digest information of the source data that introduces the content of the source data, and the like. At this time, the block chain node may invoke the privacy smart contract to perform the data publishing transaction request, and acquire the data information of the source data from the data publishing transaction request. Then, the block chain node stores the acquired data publishing transaction request and the data information of the source data contained therein in the block chain network for use by an other block chain user. In this embodiment of the present disclosure, instead of the specific content of the source data, the data information of the data is selected to be stored in the block chain network. The advantages of such selection lie in that the storage space of the block chain is greatly saved, and the efficiency of the subsequent search for the source data is improved.

Figure 3:
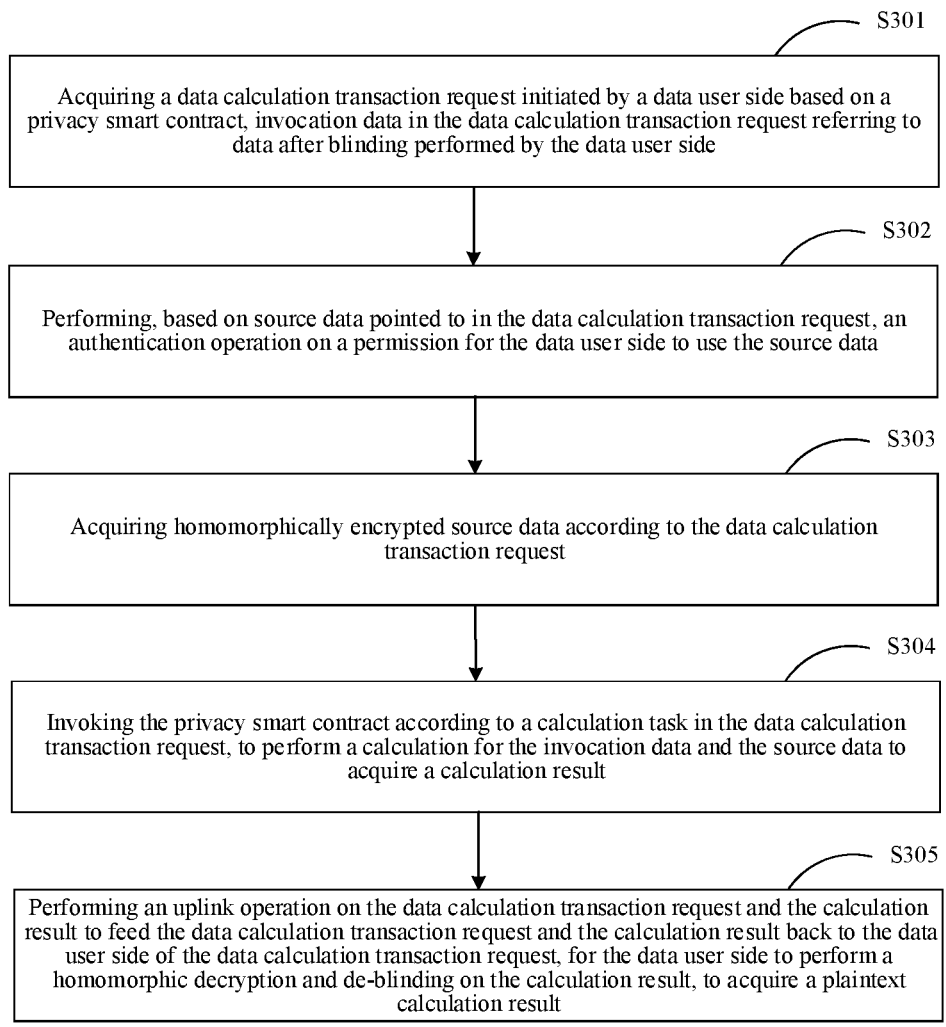
FIG. 3 is a flowchart of another method for processing privacy data of a block chain provided according to an embodiment of the present disclosure.

FIG. 3 is a flowchart of another method for processing privacy data of a block chain provided according to an embodiment of the present disclosure. This embodiment is further optimized on the basis of the above embodiments, and gives a detailed description for how an authentication is performed on the data user side after the data calculation transaction request is acquired. As shown in FIG. 3, the method specifically includes:

S301, acquiring a data calculation transaction request initiated by a data user side based on a privacy smart contract, invocation data in the data calculation transaction request referring to data after blinding performed by the data user side.

S302, performing, based on source data pointed to in the data calculation transaction request, an authentication operation on a permission for the data user side to use the source data.

Alternatively, in the embodiment of the present disclosure, after acquiring the data calculation transaction request, the local block chain node analyzes the data calculation transaction request, and acquires the source data pointed to by the data calculation transaction request and required to be used this time. Thereafter, the local block chain node first authenticates the data user side publishing this data calculation transaction request rather than acquires the source data, and determines whether the data user side has the permission to use the source data. Specifically, the way in which the block chain node authenticates the data user side is more than one, which is not limited in the embodiment of the present disclosure.

Alternative implementation 1: When initiating the data publishing transaction request, the data provider side may add data user side information to the data publishing transaction request. In this way, when performing the data publishing transaction request, the block chain node also already stores the source data and the corresponding data user side information in the block chain network. At this time, the block chain node may find, in the block chain network, the data user side information corresponding to the source data pointed to in this data calculation transaction request, and determine, according to the data user side information, whether the current data user side has the permission to use the source data. For example, if the data user side information is a condition of a user side who may use the source data, at this time, whether the current data user side meets the condition may be determined. If the data user side information refers to data user side account IDs authorized or blacklisted, at this time, whether the current data user side belongs to the data user side account IDs may be determined.

Alternative implementation 2: Based on the source data pointed to in the data calculation transaction request, an authentication request for the permission for the data user side to use the source data is sent to an authentication center to request the authentication center to process the authentication request according to a permission configured by the data provider side. The authentication result fed back by the authentication center is acquired. Here, the authentication center is a node in the block chain network that is specifically used to authenticate an authorization. The data provider side may configure, in the authentication center, the permission to use the source data published by the data provider side. Specifically, this alternative implementation may refer to that, based on the source data pointed to in the data calculation transaction request and the relevant information of the current data user side, the block chain node initiates the authentication request for permitting the data user side to use the source data and sends the authentication request to the authentication center, and the authentication center would find, in the authentication center, the permission configured by the provider side of the source data, and determine whether the current data user side conforms to the permission. If the current data user side conforms to the permission, the authentication is successful, otherwise, the authentication is failed. The block chain node acquires the authentication result fed back by the authentication center.

Alternative implementation 3: The block chain node may determine the data provider side corresponding to the source data based on the source data pointed to in the data calculation transaction request, invoke the privacy smart contract to generate an authentication transaction request of the current data user side, send the authentication transaction request to the data provider side to request the data provider side to perform an online authentication on the current data user side, and acquire an authentication result fed back by the data provider side.

It should be noted that S303 and subsequent operations thereof may be performed only after the authentication as to whether the data user side is permitted to use the source data, which is performed based on the source data pointed to in the data calculation transaction request in this step, is successful.

S303, acquiring homomorphically encrypted source data according to the data calculation transaction request.

S304, invoking the privacy smart contract according to a calculation task in the data calculation transaction request, to perform a calculation for the invocation data and the source data to acquire a calculation result.

S305, performing an uplink operation on the data calculation transaction request and the calculation result to feed the data calculation transaction request and the calculation result back to the data user side of the data calculation transaction request, for the data user side to perform a homomorphic decryption and de-blinding on the calculation result, to acquire a plaintext calculation result.

According to the technical solution of the embodiment of the present disclosure, after acquiring the data calculation transaction request initiated by the data user side, the block chain node first authenticates, based on the source data that the data user side needs to use, the permission for the data user side to use the source data. Only when the authentication is successful, the block chain node can acquire the homomorphically encrypted source data required for this calculation task and the invocation data after the blinding, invoke the privacy smart contract to perform this calculation task to obtain the calculation result, and perform the uplink storage on the calculation result. In the embodiment of the present disclosure, before the calculation task of the data calculation transaction request is processed, the permission for the data user side to use the source data is first authenticated. Thus, the source data is prevented from being used by an unauthorized data user side, and the security of the source data of the data provider side is further ensured.

Figure 4:
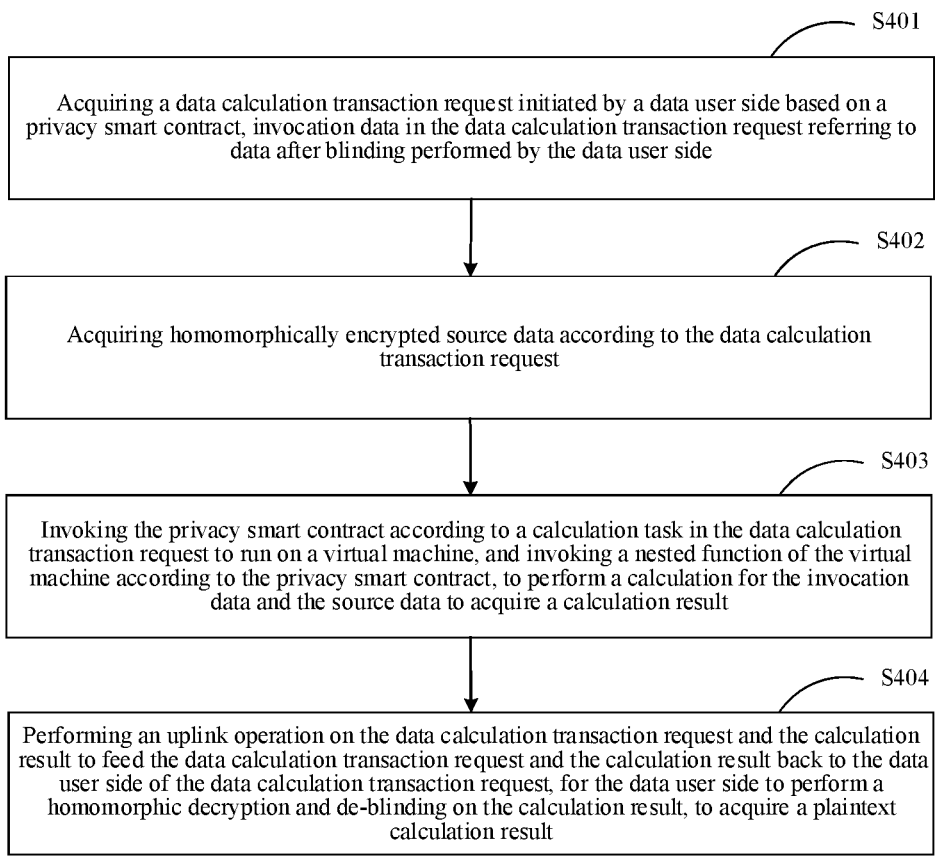
FIG. 4 is a flowchart of another method for processing privacy data of a block chain provided according to an embodiment of the present disclosure.

FIG. 4 is a flowchart of another method for processing privacy data of a block chain provided according to an embodiment of the present disclosure. This embodiment is further optimized on the basis of the above embodiments, and gives a detailed description for the process of invoking the privacy smart contract to perform the calculation for the invocation data and the source data. As shown in FIG. 4, the method specifically includes:

S401, acquiring a data calculation transaction request initiated by a data user side based on a privacy smart contract, invocation data in the data calculation transaction request referring to data after blinding performed by the data user side.

S402, acquiring homomorphically encrypted source data according to the data calculation transaction request.

S403, invoking the privacy smart contract according to a calculation task in the data calculation transaction request to run on a virtual machine, and invoking a nested function of the virtual machine according to the privacy smart contract, to perform a calculation for the invocation data and the source data to acquire a calculation result.

Here, the nested function of the virtual machine is also referred to as a built-in function and an inline function. When the nested function is invoked to run a calculation operation, it is transparent to the upper-layer invoking function of the virtual machine. Using the nested function to implement the calculation operation may accelerate the speed of the calculation.

Alternatively, when invoking the privacy smart contract according to the calculation task in the data calculation task to perform the calculation task, the block chain node needs to first invoke the smart contract to run on the virtual machine, then invoke the nested function of the virtual machine according to the smart contract, and perform this calculation task on the invocation data after the blinding and the homomorphically encrypted source data by using the nested function. The nested function performing the calculation task in this operation is directly nested in the invoking function during a compilation. When the nested function runs the calculation operation, the invoking function of the virtual machine is not required. Therefore, the operation time of the calculation is greatly saved by using the nested function to perform the calculation task, thereby improving the efficiency of the calculation.

S404, performing an uplink operation on the data calculation transaction request and the calculation result to feed the data calculation transaction request and the calculation result back to the data user side of the data calculation transaction request, for the data user side to perform a homomorphic decryption and de-blinding on the calculation result, to acquire a plaintext calculation result.

According to the technical solution of the embodiment of the present disclosure, after acquiring the data calculation transaction request initiated by the data user side, the block chain node invokes the privacy smart contract to run on the virtual machine, invokes the nested function of the virtual machine according to the smart contract, performs the specific calculation operation on the homomorphically encrypted source data and the invocation data after the blinding, and performs the uplink storage on the obtained calculation result. According to the embodiment of the present disclosure, the calculation for the source data and the invocation data is performed through the nested function of the virtual machine, which greatly saves the time of the calculation operation, and improves the efficiency of the calculation.

Figure 5:
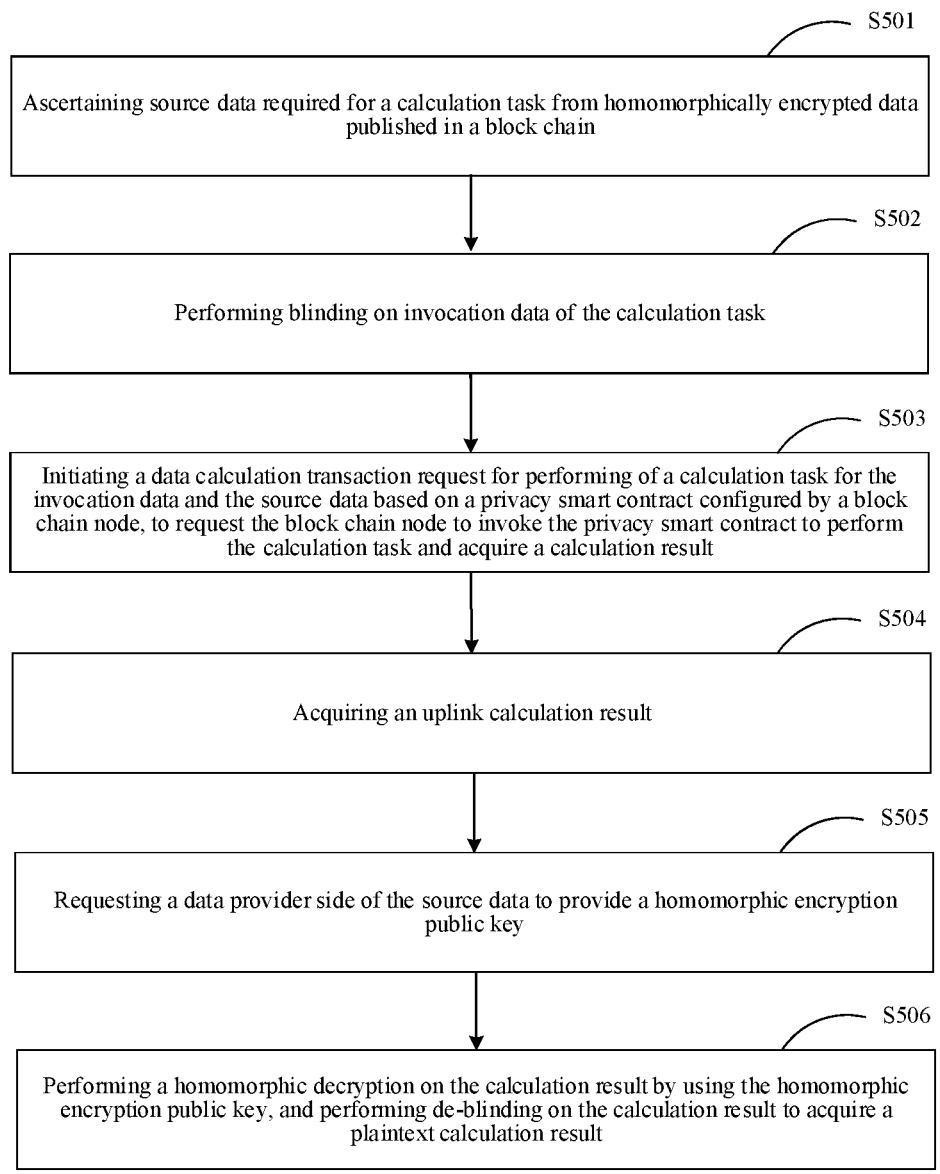
FIG. 5 is a flowchart of another method for processing privacy data of a block chain provided according to an embodiment of the present disclosure.

FIG. 5 is a flowchart of another method for processing privacy data of a block chain provided according to an embodiment of the present disclosure. The embodiment of the present disclosure is applicable to a situation where privacy data in a block chain is calculated and processed. This embodiment may be implemented by an apparatus for processing privacy data of a block chain, which is configured in a device of a block chain client. The apparatus may be implemented by means of software and/or hardware, and integrated in an electronic device of the block chain client. Alternatively, the block chain client may be a client of a block chain network installed on an electronic device of a block chain user (e.g., a data user side or a data provider side). Here, an executing body of the embodiment of the present disclosure may be the block chain client of the data user side.

S501, determining source data required for a calculation task from homomorphically encrypted data published in a block chain.

Alternatively, in the embodiment of the present disclosure, when being required to perform the calculation task by using the homomorphically encrypted data published in the block chain, the data user side may first access the block chain network through the block chain client thereof, acquire the data information (e.g., the source data ID, the source data digest information, and the data user side information) of the homomorphically encrypted source data published in the block chain, and then determine the source data required for this calculation task. Specifically, it may refer to that the data ID or the source data digest information of the homomorphically encrypted data published in the block chain is viewed to determine the source data required for this calculation task. It may also refer to that, on this basis, whether the data user side has a permission to use the source data is determined in combination with the data user side information of the source data. If the data user side has the permission, it is determined that the source data is the source data required for this current calculation task.

S502, performing blinding on invocation data of the calculation task.

Alternatively, when being required to perform the calculation task for the source data published in the block chain, the data user side may also need to invoke its own data (i.e., the invocation data). To ensure that the invocation data of the data user side is not leaked during the calculation task performed by the block chain node, the data user side may perform the blinding on the invocation data required for this calculation task through the block chain client thereof. The specific blinding process is described in detail in the above embodiment, which will not be repeatedly described in this embodiment. For example, the blinding may include adding a random value to the invocation data.

S503, initiating a data calculation transaction request for performing a calculation task for the invocation data and the source data based on a privacy smart contract configured by a block chain node, to request the block chain node to invoke the privacy smart contract to perform the calculation task and acquire a calculation result.

Alternatively, based on the privacy smart contract configured by the block chain node and in combination with the source data selected from the block chain network, the invocation data after the blinding, and the calculation task to be performed this time, the block chain client of the data user side initiates the data calculation transaction request for the performing of the calculation task for the invocation data and the source data, and sends the data calculation transaction request to the block chain network. After receiving the data calculation transaction request, the block chain node would invoke the privacy smart contract to perform the calculation task in the data calculation transaction request to obtain the calculation result, and perform uplink storage on the calculation result and the data calculation transaction request.

S504, acquiring an uplink calculation result.

Alternatively, the block chain node performs the uplink storage on the processed data calculation transaction request and the calculation result thereof. Therefore, at this time, the block chain client of the data user side may find, in the block chain, whether the calculation result of the data calculation transaction request initiated by the block chain client is uplinked. If the calculation result is uplinked, the uplink calculation result is acquired.

S505, requesting a data provider side of the source data to provide a homomorphic encryption public key.

Alternatively, the source data used the block chain node performs the calculation task for the invocation data and the source data is the source data after the homomorphic encryption performed by the data provider side. In order to obtain an accurate calculation result, it is also required to decrypt the calculation result by using the key used during the homomorphic encryption. Therefore, the block chain client of the data user side needs to request the data provider side of the source data to provide the homomorphic encryption public key.

Specifically, if the block chain network stores the homomorphic encryption public key of each data provider side, at this time, the requesting may refer to that, an acquisition request for the public key of the data provider side of the source data is published to the block chain network, to request the block chain node to feed back the homomorphic encryption public key of the source data provider side of the source data used this time. If the block chain network does not store the homomorphic encryption public key of the each data provider side, at this time, the block chain client of the data user side may directly interact with the block chain client of the data provider side to request the data provider side to provide the homomorphic encryption public key.

S506, performing a homomorphic decryption on the calculation result by using the homomorphic encryption public key, and performing de-blinding on the calculation result to acquire a plaintext calculation result.

Alternatively, after acquiring the homomorphic encryption public key of the data provider side, the block chain client of the data user side may invoke the privacy smart contract, and perform the homomorphic decryption on the calculation result by using the homomorphic encryption public key to obtain a preliminary plaintext calculation result. The preliminary plaintext calculation result is the same as the result obtained by performing this calculation task using the unencrypted plaintext of the source data. The invocation data used by the block chain node when performing the calculation task for the invocation data and the source data is the data after the blinding. Therefore, at this time, the block chain node is further required to perform, based on the inverse operation of the blinding on the invocation data that is performed by the block chain node, the de-blinding on the preliminary plaintext calculation result to obtain a final plaintext calculation result. Alternatively, if the blinding in S502 includes adding a random value to the invocation data, the de-blinding in this step includes removing the random value from the calculation result.

According to the technical solution of the embodiment of the present disclosure, the block chain client of the data user side determines the source data required for this calculation task from the homomorphically encrypted data published in the block chain, performs the blinding on the local invocation data of the calculation task, and initiates the data calculation transaction request for the performing of the calculation task for the invocation data and the source data to request the block chain node to perform the calculation task to obtain the calculation result. After acquiring the calculation result, the block chain client first requests the acquisition of the homomorphic encryption public key of the data provider side using the source data this time, and then performs the homomorphic decryption and the de-blinding on the calculation result to obtain the final plaintext calculation result. In the embodiment of the present disclosure, the source data of the data provider side that is used when the calculation task is performed is the homomorphically encrypted source data, which ensures the security of the data of the data provider side. The used invocation data of the data user side is the data after the blinding, which ensures the security of the data of the data user side. Finally, the accuracy of the calculation result is ensured through the decryption and the de-blinding. The entire calculation process does not cause the leakage of the data of the data provider side and the data user side, thereby ensuring the fairness and security of the calculation process. Thus, the scheme of processing the privacy data of the block chain is optimized.

Figure 6:
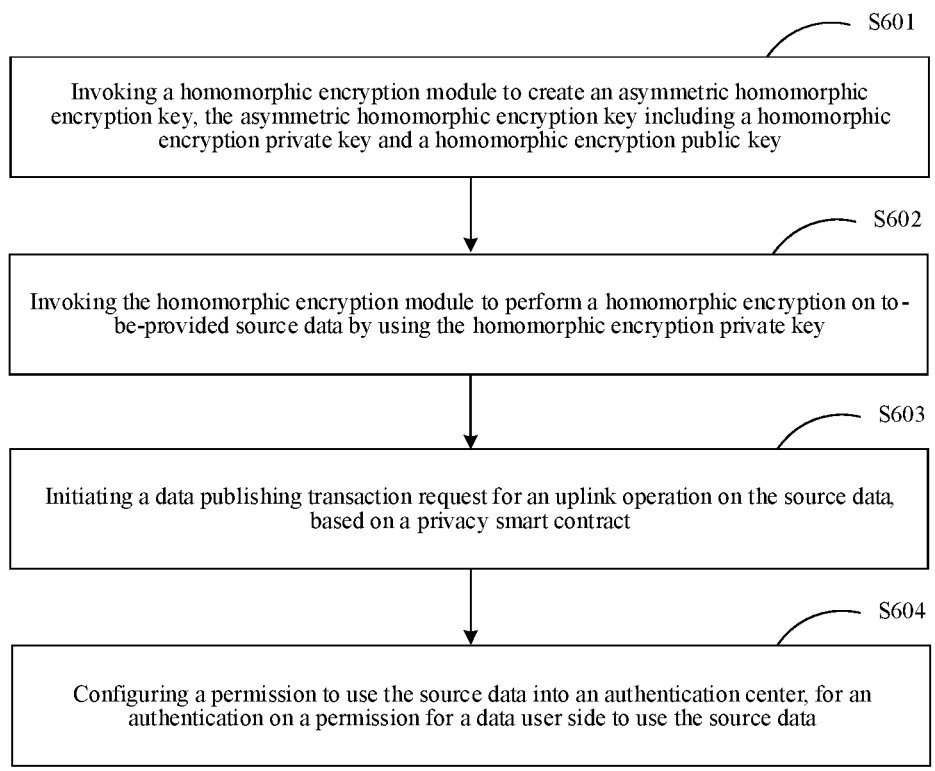
FIG. 6 is a flowchart of another method for processing privacy data of a block chain provided according to an embodiment of the present disclosure.

FIG. 6 is a flowchart of another method for processing privacy data of a block chain provided according to an embodiment of the present disclosure. This embodiment is further optimized on the basis of the above embodiments, and gives a detailed description for how the block chain client of the data provider side processes privacy data. As shown in FIG. 6, the method specifically includes:

S601, invoking a homomorphic encryption module to create an asymmetric homomorphic encryption key, the asymmetric homomorphic encryption key including a homomorphic encryption private key and a homomorphic encryption public key.

Alternatively, the homomorphic encryption module may be a module performing an operation related to a homomorphic encryption. In this step, when wanting to perform uplink storage on source data of a data provider side and share the source data with an other block chain user, the data provider side invoke a related program code creating a homomorphic encryption key in the homomorphic encryption module, to generate a pair of asymmetric homomorphic encryption keys, i.e., the homomorphic encryption public key and the homomorphic encryption private key. Here, the homomorphic encryption private key is used to locally encrypt the source data to be provided to the other block chain user for use, and the homomorphic encryption public key is used to be provided to a data user side to cause the data user side to perform a homomorphic decryption on the calculation result calculated using homomorphically encrypted source data.

S602, invoking the homomorphic encryption module to perform a homomorphic encryption on to-be-provided source data by using the homomorphic encryption private key.

Alternatively, in this step, after creating the asymmetric homomorphic encryption key, the block chain client of the data provider side may invoke the homomorphic encryption module again, and perform the homomorphic encryption on the source data to be provided to the other block chain user by using the homomorphic encryption private key created in S601, to obtain the homomorphically encrypted source data. Alternatively, in the embodiment of the present disclosure, the homomorphic encryption may be performed using any homomorphic encryption algorithm, which is not limited.

For example, the homomorphic encryption algorithm may be a Pallier homomorphic encryption algorithm.

S603, initiating a data publishing transaction request for an uplink operation on the source data, based on a privacy smart contract.

Alternatively, after performing the homomorphic encryption on the to-be-provided source data, the block chain client of the data provider side may invoke the privacy smart contract to generate the data publishing transaction request including the homomorphically encrypted source data and send the data publishing transaction request to the block chain network, such that the block chain node invokes the privacy smart contract to perform the data publishing transaction request to perform the uplink storage on the source data.

Alternatively, in order to facilitate the data user side quickly finding the required source data, the data publishing transaction request initiated based on the privacy smart contract in this step may include the description information of the source data and source data digest information. In order to save the storage space of the block chain, this step may also refer to that the uplink storage is not performed on the homomorphically encrypted source data, but refer to that the source data is stored at a preset position, and then the uplink storage is performed on the storage position of the source data. That is, the data publishing transaction request for the uplink operation on the source data, which is initiated in this step, may include the storage position of the source data.

S604, configuring a permission to use the source data into an authentication center, for an authentication as to whether the data user side is permitted to use the source data.

Alternatively, in the embodiment of the present disclosure, after completing the uplink storage on the homomorphically encrypted source data, the data provider side may configure the permission to use the source data provided by itself into the authentication center, for the authentication center to subsequently perform the authentication as to whether the data user side is permitted to use the source data, which prevents the source data from being used by a user without the permission, and further ensures the security of the source data.

Alternatively, in this step, the process of configuring the permission to use the source data into the authentication center may be more than one, which is not limited. For example, the account ID of a data user side capable of using the source data may be set in the authentication center. A condition for a user side capable of using the source data may also be set in the authentication center. The account ID of a user incapable of using the source data may also be set in the authentication center. Alternatively, in the embodiment of the present disclosure, the permission to use the source data may not be pre-configured. Moreover, an online authentication may be performed through the interaction between the authentication center and the data provider side, when the user side uses the source data.

According to the technical solution of the embodiment of the present disclosure, when wanting to uplink the source data to the block chain network, the data provider side may first invoke, through its block chain client, the homomorphic encryption module to create the pair of homomorphic encryption keys, perform the homomorphic encryption on the to-be-provided source data by using the homomorphic encryption private key, and then initiate, based on the privacy smart contract, the data publishing transaction request for the uplink operation on the homomorphically encrypted source data. In the embodiment of the present disclosure, the source data on which the uplink storage is performed is the homomorphically encrypted source data. The calculation result that is the same as the unencrypted source data may be obtained after the calculation result of the homomorphically encrypted source data is decrypted. Therefore, in the embodiment, while it is ensured that the user side of the data normally uses the source data, the leakage of the plaintext of the source data of the data provider side is avoided, which ensures the fairness and security of the calculation process. In addition, after performing the uplink operation on the source data, the data provider side further configures the permission to use the source data into the authentication center, for the authentication center to authenticate the data user side, thereby further ensuring the security of the source data. Thus, an unauthorized user is prevented from using the source data at random.

Figure 7A:
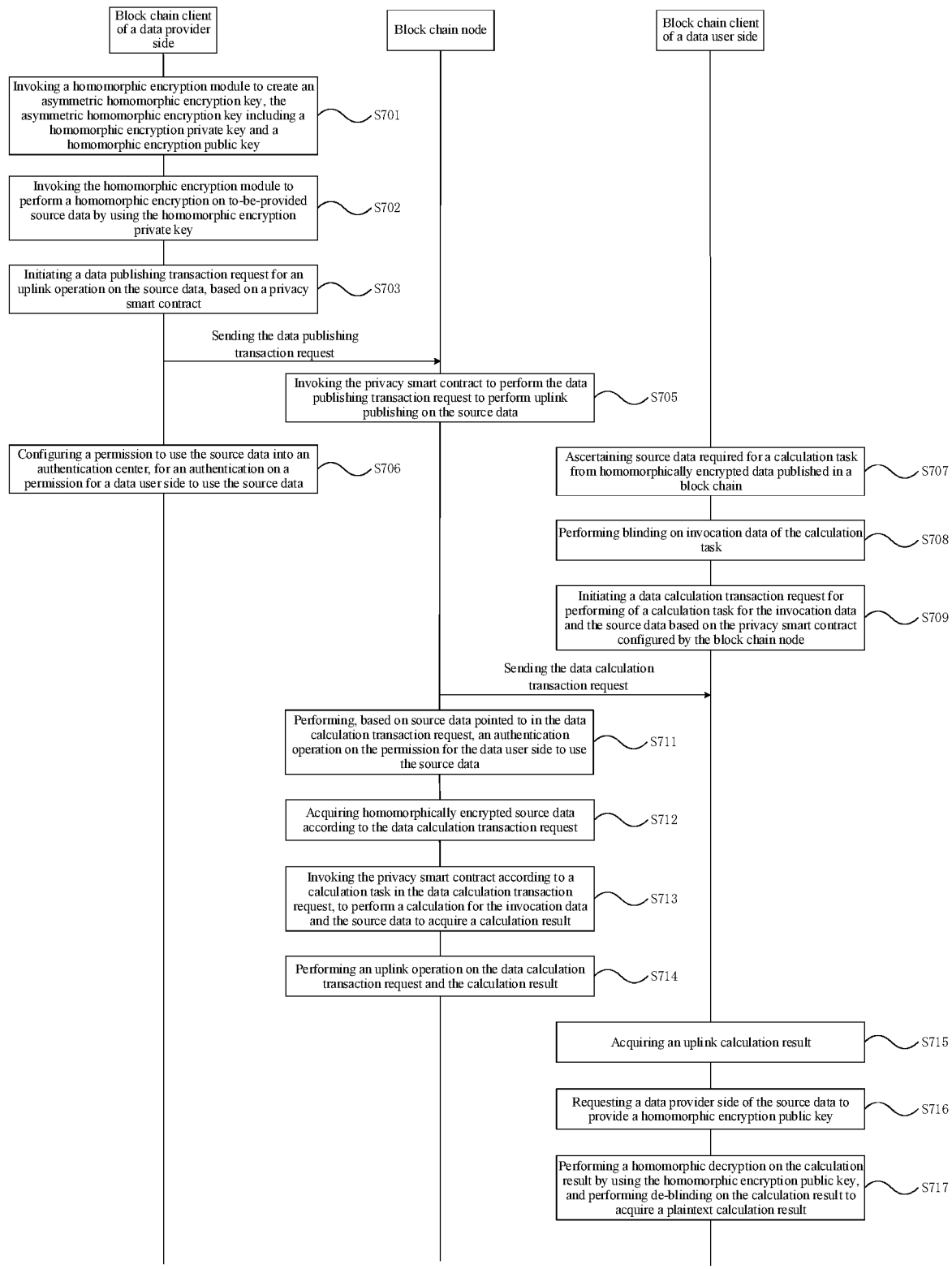
FIG. 7A is a signaling diagram of a method for processing privacy data of a block chain provided according to an embodiment of the present disclosure.
Figure 7B:
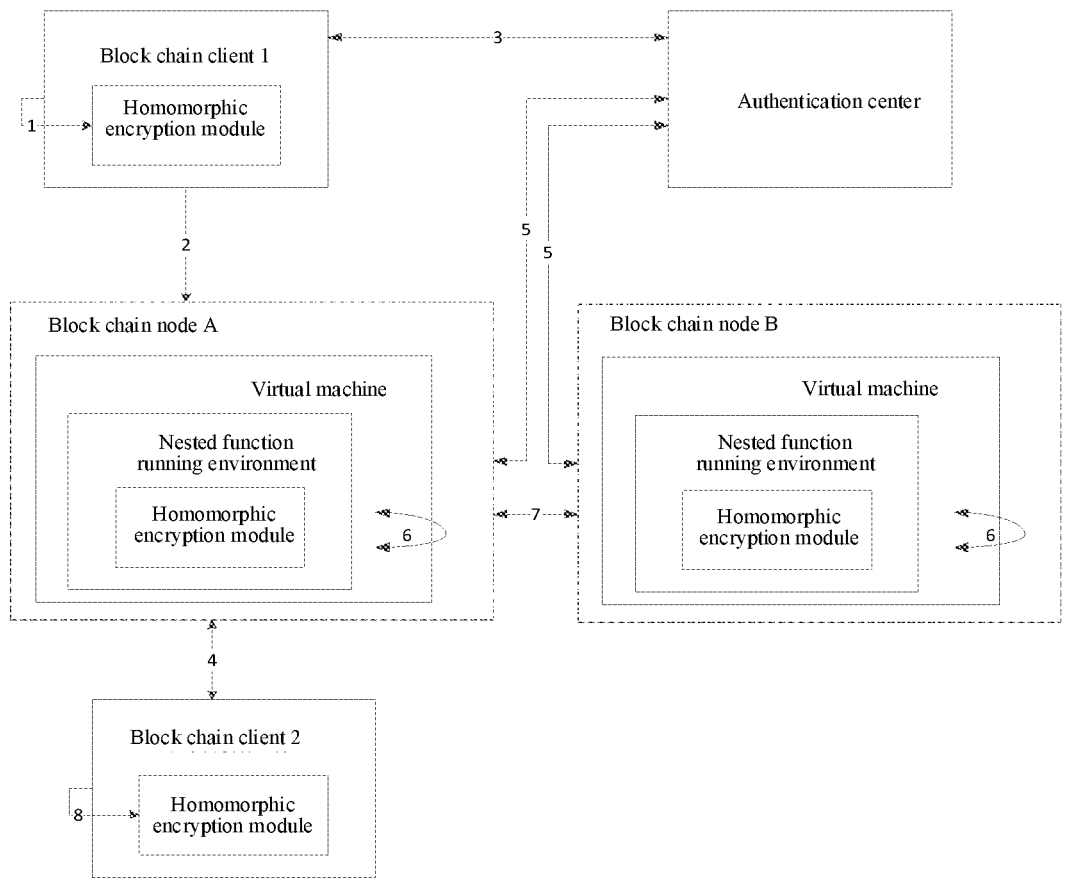
FIG. 7B is a schematic diagram of a system architecture processing privacy data of a block chain provided according to the embodiment of the present disclosure.

FIG. 7A is a signaling diagram of a method for processing privacy data of a block chain provided according to an embodiment of the present disclosure. FIG. 7B is a schematic diagram of a system architecture processing privacy data of a block chain provided according to the embodiment of the present disclosure. This embodiment is further optimized on the basis of the above embodiments, and gives a detailed description for how the block chain client of the data user side, the block chain client of the data provider side and the block chain node cooperate with each other to implement the processing for the privacy data of the block chain. As shown in FIGS. 7A-7B, the method specifically includes:

S701, invoking, by a block chain client of a data provider side, a homomorphic encryption module to create an asymmetric homomorphic encryption key, the asymmetric homomorphic encryption key including a homomorphic encryption private key and a homomorphic encryption public key.

S702, invoking, by the block chain client of the data provider side, the homomorphic encryption module to perform a homomorphic encryption on to-be-provided source data by using the homomorphic encryption private key.

Alternatively, steps S701-S702 may be performed by the block chain client 1 in FIG. 7B. At this time, the block chain client 1 is the block chain client of the data provider side, and may be a superchain software development kit SDK. The homomorphic encryption module such as a Pallier homomorphic encryption module is integrated in the block chain client 1. At this time, the block chain client 1 may perform the operation of arrow 1 in FIG. 7B, to invoke the homomorphic encryption module therein to generate a pair of asymmetric homomorphic encryption keys (i.e., the homomorphic encryption public key and the homomorphism secret private key), and then continue to invoke the homomorphic encryption module to perform the homomorphic encryption on the to-be-provided source data by using the homomorphic encryption private key.

S703, initiating, by the block chain client of the data provider side, a data publishing transaction request for an uplink operation on the source data, based on a privacy smart contract.

Alternatively, this step is also performed by the block chain client 1 in FIG. 7B. At this time, the block chain client 1 may perform the operation of arrow 2 in FIG. 7B, and initiate the data publishing transaction request for the uplink operation on the source data, based on the privacy smart contract.

S704, acquiring, by a block chain node, the data publishing transaction request initiated by the data provider side based on the privacy smart contract, the source data in the data publishing transaction request referring to homomorphically encrypted data.

S705, invoking, by the block chain node, the privacy smart contract to perform the data publishing transaction request to perform uplink publishing on the source data.

Alternatively, two block chain nodes (i.e., the block chain node A and the block chain node B) are shown in FIG. 7B, and have the same structure. A virtual machine (e.g., a WebAssembly virtual machine) is created in the block chain nodes of the present disclosure, and a nested function is nested in the virtual machine, and invokes, in its running environment, a homomorphic encryption module to perform a related operation for the homomorphically encrypted source data.

Alternatively, FIG. 7B shows that the operations of steps S704-S705 are performed by the block chain node A and the block chain node B in FIG. 7B. Specifically, the block chain node A and the block chain node B may invoke the privacy smart contract to run on the virtual machine, and invoke the nested function of the virtual machine according to the privacy smart contract. The nested function invokes the homomorphic encryption module to perform the operation of arrow 6 at this time, that is, perform the data publishing transaction request to perform the uplink publishing on the source data. Alternatively, the uplink operation on the source data may also be performed by an upper-layer function of the virtual machine, which is not limited in this embodiment.

S706, configuring, by the block chain client of the data provider side, a permission to use the source data into an authentication center, for an authentication as to whether the data user side is permitted to use the source data.

Alternatively, this step corresponds to the operation of arrow 3 in FIG. 7B. The source data provided by the block chain client 1 is configured, by the block chain client 1, with the permission in the authentication center. Subsequently, the authentication center authenticates the permission for the data user side to use the source data.

S707, determining, by a block chain client of the data user side, source data required for a calculation task from homomorphically encrypted data published in a block chain.

S708, performing, by the block chain client of the data user side, blinding on invocation data of the calculation task.

S709, initiating, by the block chain client of the data user side, a data calculation transaction request for performing of a calculation task for the invocation data and the source data based on the privacy smart contract configured by the block chain node.

Alternatively, steps S707-S709 may be performed by the block chain client 2 in FIG. 7B. At this time, the block chain client 2 is the block chain client of the data user side, and the block chain client 2 may also be a superchain SDK. The homomorphic encryption module such as the Pallier homomorphic encryption module is integrated in the block chain client 2. At this time, the block chain client 2 may perform the operation of arrow 4 in FIG. 7B, to first determine the source data required for this calculation task from the homomorphically encrypted data published in the block chain, and then perform the blinding on the invocation data of the data user side itself, and initiate the data calculation transaction request for the performing of the calculation task for the invocation data and the source data to the block chain network, based on the privacy smart contract configured by the block chain node. Alternatively, the blinding includes adding a random value to the invocation data.

S710, acquiring, by the block chain node, a data calculation transaction request initiated by the data user side based on the privacy smart contract, invocation data in the data calculation transaction request referring to data after blinding performed by the data user side.

S711, performing, by the block chain node based on source data pointed to in the data calculation transaction request, an authentication as to whether the data user side is permitted to use the source data.

Alternatively, the arrow 5 in FIG. 7B shows the operation of this step. That is, based on the source data pointed to in the data calculation transaction request, the block chain node A and the block chain node B send the authentication request for the permission for the data user side to use the source data to the authentication center, to request the authentication center to process the authentication request according to the permission configured by the data provider side. The block chain node A and the block chain node B acquire the authentication result fed back by the authentication center.

S712, acquiring, by the block chain node, homomorphically encrypted source data according to the data calculation transaction request.

S713, invoking, by the block chain node, the privacy smart contract according to a calculation task in the data calculation transaction request, to perform a calculation for the invocation data and the source data to acquire a calculation result.

S714, performing, by the block chain node, an uplink operation on the data calculation transaction request and the calculation result.

Alternatively, the operations of step S712-S714 are performed by the block chain node A and the block chain node B in FIG. 7B. Specifically, the block chain node A and the block chain node B may invoke the privacy smart contract to run on the virtual machine, and invoke the nested function of the virtual machine according to the privacy smart contract. The nested function invokes the homomorphic encryption module to perform the operation of arrow 6 at this time, that is, to perform the uplink operation on the data calculation transaction request and the calculation result.

It should be noted that, the operations of step S710-S714 are performed by the block chain node A and the block chain node B in FIG. 7B. here, the block chain node A performs the above operations in the process of pre-performing the data calculation transaction request, and the block chain node B performs the above operations in the process of verifying the result of the performing of the block chain node A.

S715, acquiring, by the block chain client of the data user side, an uplink calculation result.

S716, requesting, by the block chain client of the data user side, a data provider side of the source data to provide a homomorphic encryption public key.

S717, performing, by the block chain client of the data user side, a homomorphic decryption on the calculation result by using the homomorphic encryption public key, and performing, by the block chain client of the data user side, de-blinding on the calculation result to acquire a plaintext calculation result.

Alternatively, after completing the uplink operation on the data calculation transaction request and the calculation result, the block chain node performs the transaction broadcast operation of arrow 7 in FIG. 7B, to inform an other block chain node of the calculation result. At this time, the data user side may perform the operation of arrow 8 in FIG. 7B through the block chain client 2 thereof, that is, acquire the uplink calculation result. The source data used by the calculation result is the homomorphically encrypted source data. Thus, at this time, the block chain client 2 needs to first request the homomorphic encryption public key of the data provider side of the source data, and then invoke the privacy smart contract to run on the virtual machine and invoke the nested function of the virtual machine according to the privacy smart contract. The nested function invokes the homomorphic encryption module to perform the homomorphic decryption on the calculation result by using the homomorphically encrypted public key, and perform de-blinding on the calculation result to obtain the final plaintext the calculation result.

Alternatively, if the blinding in S708 includes adding a random value to the invocation data, the de-blinding in this step includes removing the random value from the calculation result.

According to the solution of the embodiment of the present disclosure, a solution in which the data provider side, the data user side and the block chain node interact with each other to process the privacy data is provided. In the embodiment, the uplink storage is performed on the homomorphically encrypted source data of the data provider. When initiating the data calculation task, the data user side performs the blinding on the invocation data thereof, such that the block chain node would not disclose the plaintext of the source data and the plaintext of the invocation data when performing the calculation task, which ensures the security of the data of the data user side and the data provider side. In addition, the accurate plaintext calculation result may also be obtained by performing the homomorphic decryption and the blinding on the calculation result, and thus, the scheme of processing the privacy data of the block chain is greatly optimized.

Figure 8:
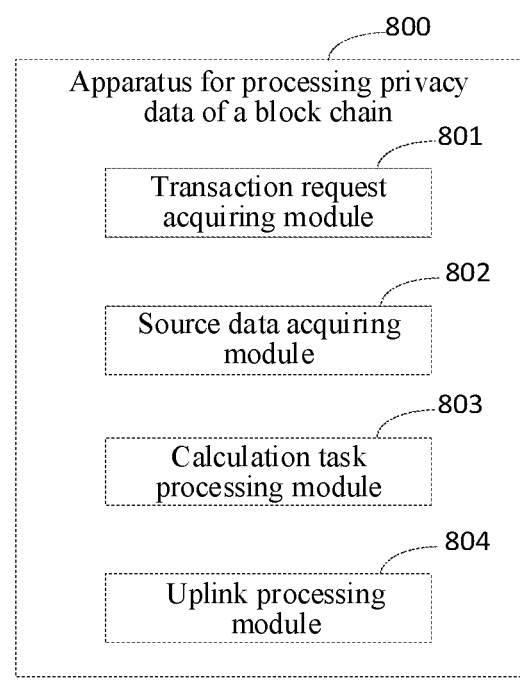
FIG. 8 is a schematic structural diagram of an apparatus for processing privacy data of a block chain according to an embodiment of the present disclosure.

FIG. 8 is a schematic structural diagram of an apparatus for processing privacy data of a block chain according to an embodiment of the present disclosure. The embodiment of the present disclosure is applicable to a situation where privacy data in a block chain is calculated and processed. This apparatus may implement the method for processing privacy data of a block chain, performed by the block chain node, in the embodiments of the present disclosure. The apparatus may be integrated in an electronic device used as the block chain node. The apparatus 800 specifically includes:

a transaction request acquiring module 801, configured to acquire a data calculation transaction request initiated by a data user side based on a privacy smart contract, invocation data in the data calculation transaction request referring to data after blinding performed by the data user side;

a source data acquiring module 802, configured to acquire homomorphically encrypted source data according to the data calculation transaction request;

a calculation task processing module 803, configured to invoke the privacy smart contract according to a calculation task in the data calculation transaction request, to perform a calculation for the invocation data and the source data to acquire a calculation result; and an uplink processing module 804, configured to perform an uplink operation on the data calculation transaction request and the calculation result to feed the data calculation transaction request and the calculation result back to the data user side of the data calculation transaction request, for the data user side to perform a homomorphic decryption and de-blinding on the calculation result, to acquire a plaintext calculation result.

According to the technical solution of the embodiment of the present disclosure, after acquiring the data calculation transaction request initiated by the data user side, the block chain node acquires the homomorphically encrypted source data required for the performing of this calculation task and the invocation data after the blinding, invokes the privacy smart contract to perform this calculation task to obtain the calculation result, and performs the uplink storage on the calculation result. In the embodiment of the present disclosure, the source data used when the calculation task is performed is the source data after the homomorphic encryption performed by the data provider side, which ensures the security of the data of the data provider side. The invocation data used is the data after the blinding performed by the data user side, which ensures the security of the data of the data user side. Finally, the accuracy of the calculation result is ensured through the decryption and the de-blinding. The entire process of processing the privacy data may be completed by using a conventional block chain node without causing the leakage of the data of the data provider side and the data user side, thereby ensuring the fairness and security of the privacy data processing process. Thus, the scheme of processing the privacy data of the block chain is optimized.

Further, the transaction request acquiring module 801 is further configured to: acquire a data publishing transaction request initiated by a data provider side based on the privacy smart contract, source data in the data publishing transaction request referring to homomorphically encrypted data.

The uplink processing module 804 is further configured to: invoke the privacy smart contract to perform the data publishing transaction request to perform uplink publishing on the source data.

Further, the blinding includes adding a random value to the invocation data, and the de-blinding includes removing the random value from the calculation result.

Further, the apparatus further includes: an authentication processing module, configured to perform, based on source data pointed to in the data calculation transaction request, an authentication as to whether the data user side is permitted to use the source data.

Further, the authentication processing module includes:

an authentication request sending unit, configured to send, based on the source data pointed to in the data calculation transaction request, an authentication request for the permission for the data user side to use the source data to an authentication center, to request the authentication center to process the authentication request according to a permission configured by the data provider side; and an authentication result acquiring unit, configured to acquire an authentication result fed back by the authentication center.

Further, the calculation task processing module 803 is configured to:

invoke the privacy smart contract to run on a virtual machine, and invoke a nested function of the virtual machine according to the privacy smart contract, to perform the calculation for the invocation data and the source data.

Figure 9:
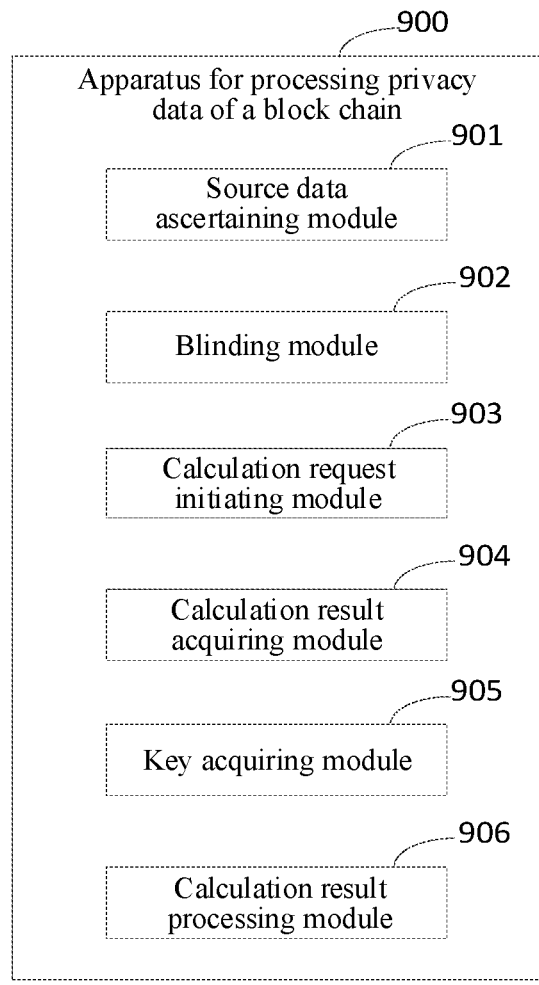
FIG. 9 is a schematic structural diagram of an apparatus for processing privacy data of a block chain according to an embodiment of the present disclosure.

FIG. 9 is a schematic structural diagram of an apparatus for processing privacy data of a block chain according to an embodiment of the present disclosure. The embodiment of the present disclosure is applicable to a situation where privacy data in a block chain is calculated and processed. This apparatus may implement the method for processing privacy data of a block chain, performed by the block chain client, in the embodiments of the present disclosure. The apparatus may be integrated in an electronic device having the block chain client. The apparatus 900 specifically includes:

a source data determining module 901, configured to determine source data required for a calculation task from homomorphically encrypted data published in a block chain;

a blinding module 902, configured to perform blinding on invocation data of the calculation task;

a calculation request initiating module 903, configured to initiate a data calculation transaction request for performing of a calculation task for the invocation data and the source data based on a privacy smart contract configured by a block chain node, to request the block chain node to invoke the privacy smart contract to perform the calculation task and acquire a calculation result;

a calculation result acquiring module 904, configured to acquire an uplink calculation result;

a key acquiring module 905, configured to request a data provider side of the source data to provide a homomorphic encryption public key; and a calculation result processing module 906, configured to perform a homomorphic decryption on the calculation result by using the homomorphic encryption public key, and perform de-blinding on the calculation result to acquire a plaintext calculation result.

According to the technical solution of the embodiment of the present disclosure, the block chain client of the data user side determines the source data required for this calculation from the homomorphically encrypted data published in the block chain, performs the blinding on the local invocation data of the calculation task, and initiates the data calculation transaction request for the performing of the calculation task for the invocation data and the source data to request the block chain node to perform the calculation task to obtain the calculation result. After acquiring the calculation result, the block chain client first requests the acquisition of the homomorphic encryption public key of the data provider side using the source data this time, and then performs the homomorphic decryption and the de-blinding on the calculation result to obtain the final plaintext calculation result. In the embodiment of the present disclosure, the source data of the data provider side that is used when the calculation task is performed is the homomorphically encrypted source data, which ensures the security of the data of the data provider side. The used invocation data of the data user side is the data after the blinding, which ensures the security of the data of the data user side. Finally, the accuracy of the calculation result is ensured through the decryption and the de-blinding. The entire calculation process does not cause the leakage of the data of the data provider side and the data user side, thereby ensuring the fairness and security of the calculation process. Thus, the scheme of processing the privacy data of the block chain is optimized.

Further, the blinding comprises adding a random value to the invocation data, and the de-blinding comprises removing the random value from the calculation result.

Further, the apparatus further includes:

a key creating module, configured to invoke a homomorphic encryption module to create an asymmetric homomorphic encryption key, the asymmetric homomorphic encryption key including a homomorphic encryption private key and a homomorphic encryption public key;

a homomorphically encrypting module, configured to invoke the homomorphic encryption module to perform a homomorphic encryption on to-be-provided source data by using the homomorphic encryption private key; and an uplink request publishing module, configured to initiate a data publishing transaction request for an uplink operation on the source data, based on the privacy smart contract.

Further, the apparatus further includes: a permission configuring module, configured to configure a permission to use the source data into an authentication center, for an authentication as to whether the data user side is permitted to use the source data.

According to embodiments of the present disclosure, the present disclosure further provides an electronic device and a readable storage medium.

Figure 10:
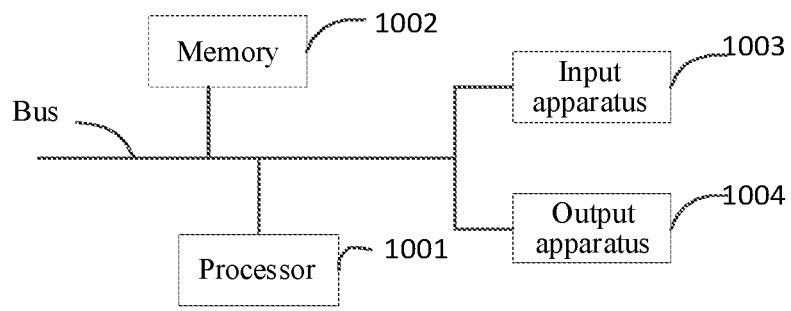
FIG. 10 is a block diagram of an electronic device adapted to implement the method for processing privacy data of a block chain according to embodiments of the present disclosure.

As shown in FIG. 10, FIG. 10 is a block diagram of an electronic device of the method for processing privacy data of a block chain according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 10, the electronic device includes one or more processors 1001, a storage device 1002, and an interface for connecting parts, the interface including a high speed interface and a low speed interface. The parts are interconnected using different buses, and may be mounted on a common motherboard or in other ways as needed. The processors may process an instruction executed within the electronic device, the instruction including an instruction stored in the storage device or on the storage device to display graphical information of a GUI on an external input/output apparatus such as a display device coupled to the interface. In other implementations, a plurality of processors and/or a plurality of buses may be used, if desired, along with a plurality of storage devices. Also, a plurality of electronic devices may be connected, and each device provides a portion of necessary operations (e.g., as a server array, a group of blade servers or a multi-processor system). In FIG. 10, one processor 1001 is taken as an example.

The storage device 1002 is a non-transitory computer readable storage medium provided in the present disclosure. Here, the storage device stores an instruction executable by at least one processor, to cause the at least one processor to perform the method for processing privacy data of a block chain provided in the present disclosure. The non-transitory computer readable storage medium in the present disclosure stores a computer instruction, the computer instruction being used to cause a computer to perform the method for processing privacy data of a block chain provided in the present disclosure.

As the non-transitory computer readable storage medium, the storage device 1002 may be used to store a non-transitory software program, a non-transitory computer executable program and a module such as a program instruction/module (e.g., the transaction request acquiring module 801, the source data acquiring module 802, the calculation task processing module 803 and the uplink processing module 804 shown in FIG. 8; or the source data determining module 901, the blinding module 902, the calculation request initiating module 903, the calculation result acquiring module 904, the key acquiring module 905 and the calculation result processing module 906 shown in FIG. 9) corresponding to the method for processing privacy data of a block chain in the embodiments of the present disclosure. The processor 1001 executes various functional applications and data processing of the server by running the non-transitory software program, the instruction and the module stored in the storage device 1002, i.e., implements the method for processing privacy data of a block chain in the above embodiments of the method.

The storage device 1002 may include a storage program area and a storage data area. Here, the storage program area may store an operating system and an application program required for at least one function. The storage data area may store data, etc. created according to the use of an electronic device of the method for processing privacy data of a block chain. In addition, the storage device 1002 may include a high speed random access memory, and may also include a non-transitory storage device, for example, at least one magnetic disk storage device, a flash storage device, or other non-transitory solid state storage devices. In some embodiments, the storage device 1002 may alternatively include a storage device disposed remotely relative to the processor 1001.

The remote storage device may be connected to the electronic device of the method for processing privacy data of a block chain via a network. Examples of such network include, but not limited to, the Internet, an enterprise intranet, a local area network, a mobile communication network, and a combination thereof.

The electronic device of the method for processing privacy data of a block chain may further include: an input apparatus 1003 and an output apparatus 1004. The processor 1001, the storage device 1002, the input apparatus 1003 and the output apparatus 1004 may be connected via a bus or in other ways. In FIG. 10, the connection via the bus is taken as an example.

The input apparatus 1003 may receive an inputted number or inputted character information, and generate a key signal input related to the user setting and functional control of the electronic device of the method for processing privacy data of a block chain. For example, the input apparatus is a touch screen, a keypad, a mouse, a track pad, a touch pad, a pointing stick, one or more mouse buttons, a track ball, a joystick, or the like. The output apparatus 1004 may include a display device, an auxiliary lighting apparatus (e.g., an LED), a tactile feedback apparatus (e.g., a vibration motor), etc. The display device may include, but not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, the block chain client of the data user side determines the source data required for this calculation from the homomorphically encrypted data published in the block chain, performs the blinding on the local invocation data of the calculation task, and initiates the data calculation transaction request for the performing of the calculation task for the invocation data and the source data to request the block chain node to perform the calculation task to obtain the calculation result. After acquiring the calculation result, the block chain client first requests the acquisition of the homomorphic encryption public key of the data provider side using the source data this time, and then performs the homomorphic decryption and the de-blinding on the calculation result to obtain the final plaintext calculation result. In the embodiments of the present disclosure, the source data of the data provider side that is used when the calculation task is performed is the homomorphically encrypted source data, which ensures the security of the data of the data provider side. The used invocation data of the data user side is the data after the blinding, which ensures the security of the data of the data user side. Finally, the accuracy of the calculation result is ensured through the decryption and the de-blinding. The entire calculation process does not cause the leakage of the data of the data provider side and the data user side, thereby ensuring the fairness and security of the calculation process. Thus, the scheme of processing the privacy data of the block chain is optimized.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing privacy data of a block chain by a block chain node, the method comprising:
   acquiring a data calculation transaction request, wherein the request is initiated by a data user side based on a privacy smart contract, and invocation data in the request refers to data after blinding performed by the data user side, wherein the blinding is processing the invocation data thereof according to a rule set by the data user side;
   acquiring homomorphically encrypted source data according to the request;
   invoking the privacy smart contract according to a calculation task in the request, to perform a calculation for the invocation data and the source data to acquire a calculation result; and
   performing an uplink operation on the request and the calculation result to feed the request and the calculation result back to the data user side, such that the data user side homomorphically decrypts and de-blinds the calculation result to acquire a plaintext calculation result.

2. The method according to claim 1, further comprising:
   acquiring a data publishing transaction request initiated by a data provider side based on the privacy smart contract, wherein source data in the data publishing transaction request refers to homomorphically encrypted data; and
   invoking the privacy smart contract to perform the data publishing transaction request to perform uplink publishing on the source data.

3. The method according to claim 1, wherein the blinding comprises: adding a random value to the invocation data, and the de-blinding comprises: removing the random value from the calculation result.

4. The method according to claim 1, wherein after the acquiring a data calculation transaction request initiated by a data user side based on a privacy smart contract, the method further comprises:
   performing, based on source data pointed in the data calculation transaction request, an authentication as to whether the data user side is permitted to use the source data.

5. The method according to claim 4, wherein the performing the authentication operation comprises:
   sending, based on the source data pointed in the data calculation transaction request, an authentication request for permitting the data user side to use the source data to an authentication center, to request the authentication center to process the authentication request according to a permission configured by a data provider side; and
   acquiring an authentication result fed back by the authentication center.

6. The method according to claim 1, wherein invoking the privacy smart contract to perform the calculation for the invocation data and the source data comprises:
   invoking the privacy smart contract to run on a virtual machine, and
   invoking a nested function of the virtual machine according to the privacy smart contract, to perform the calculation for the invocation data and the source data.

7. A method for processing privacy data of a block chain, performed by a block chain client, the method comprising:
   determining source data required for a calculation task from homomorphically encrypted data published in a block chain;
   blinding invocation data of the calculation task, wherein the blinding is processing the invocation data thereof according to a rule set by the data user side;
   initiating a data calculation transaction request for performing a calculation task for the invocation data and the source data based on a privacy smart contract configured by a block chain node, to request the block chain node to invoke the privacy smart contract to perform the calculation task and acquire a calculation result;
   acquiring an uplink calculation result;
   requesting a data provider side of the source data to provide a homomorphic encryption public key; and
   decrypting homomorphically the calculation result by using the homomorphic encryption public key, and de-blinding the calculation result to acquire a plaintext calculation result.

8. The method according to claim 7, wherein the blinding comprises: adding a random value to the invocation data, and the de-blinding comprises: removing the random value from the calculation result.

9. The method according to claim 7, further comprising:
   invoking a homomorphic encryption module to create an asymmetric homomorphic encryption key, the asymmetric homomorphic encryption key including a homomorphic encryption private key and a homomorphic encryption public key;
   invoking the homomorphic encryption module to perform a homomorphic encryption on to-be-provided source data by using the homomorphic encryption private key; and
   initiating a data publishing transaction request for an uplink operation on the source data, based on the privacy smart contract.

10. The method according to claim 9, wherein after the initiating a data publishing transaction request for an uplink operation on the source data, the method further comprises:
    configuring a permission to use the source data into an authentication center, to make an authentication as to whether a data user side is permitted to use the source data to.

11. An electronic device, comprising:
    at least one processor; and
    a storage device, communicated with the at least one processor, wherein the storage device stores an instruction executable by the at least one processor to perform an operation for processing privacy data of a block chain by a block chain node, the operation comprising:

acquiring a data calculation transaction request, wherein the request is initiated by a data user side based on a privacy smart contract, and invocation data in the request refers to data after blinding performed by the data user side, wherein the blinding is processing the invocation data thereof according to a rule set by the data user side;

acquiring homomorphically encrypted source data according to the request;

invoking the privacy smart contract according to a calculation task in the request, to perform a calculation for the invocation data and the source data to acquire a calculation result; and performing an uplink operation on the request and the calculation result to feed the request and the calculation result back to the data user side, such that the data user side homomorphically decrypts and de-blinds the calculation result to acquire a plaintext calculation result.

12. The electronic device according to claim 11, further comprising:

acquiring a data publishing transaction request initiated by a data provider side based on the privacy smart contract, wherein source data in the data publishing transaction request refers to homomorphically encrypted data; and invoking the privacy smart contract to perform the data publishing transaction request to perform uplink publishing on the source data.

13. The electronic device according to claim 11, wherein the blinding comprises: adding a random value to the invocation data, and the de-blinding comprises: removing the random value from the calculation result.

14. The electronic device according to claim 11, wherein after the acquiring a data calculation transaction request initiated by a data user side based on a privacy smart contract, the at least one processor further comprises:

performing, based on source data pointed in the data calculation transaction request, an authentication as to whether the data user side is permitted to use the source data.

15. The electronic device according to claim 14, wherein the performing the authentication operation comprises:

sending, based on the source data pointed in the data calculation transaction request, an authentication request for permitting the data user side to use the source data to an authentication center, to request the authentication center to process the authentication request according to a permission configured by a data provider side; and acquiring an authentication result fed back by the authentication center.

16. The electronic device according to claim 11, wherein invoking the privacy smart contract to perform the calculation for the invocation data and the source data comprises:

invoking the privacy smart contract to run on a virtual machine, and invoking a nested function of the virtual machine according to the privacy smart contract, to perform the calculation for the invocation data and the source data.

17. An electronic device, comprising:

at least one processor; and a storage device, communicated with the at least one processor, wherein the storage device stores an instruction executable by the at least one processor to perform the method of claim 7.

18. A non-transitory computer readable storage medium, storing a computer instruction, wherein the computer instruction is used to cause the computer to perform the method of claim 1.

19. A non-transitory computer readable storage medium, storing a computer instruction, wherein the computer instruction is used to cause the computer to perform the method of claim 7.

* * * * *